United States Patent
Brennan, III et al.

(10) Patent No.: US 6,311,524 B1
(45) Date of Patent: Nov. 6, 2001

(54) ACCELERATED METHOD FOR INCREASING THE PHOTOSENSITIVITY OF A GLASSY MATERIAL

(75) Inventors: James F. Brennan, III, St. Paul; Diann A. Sloan; Maureen T. Fahey, both of Austin, all of TX (US); James C. Novack, Hudson, WI (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 09/616,117

(22) Filed: Jul. 14, 2000

(51) Int. Cl.[7] .................................................. G01N 23/00
(52) U.S. Cl. ............................ 65/378; 65/399; 65/425; 385/10; 385/141; 427/163.2; 427/377; 427/384; 427/389.7; 427/389.8
(58) Field of Search ............................ 65/399, 425, 378; 427/163.2, 377, 384, 389.7, 389.8; 385/10, 141

(56) References Cited

U.S. PATENT DOCUMENTS

| | | | |
|---|---|---|---|
| 3,980,390 | * | 9/1976 | Yamamoto et al. . |
| 5,235,659 | * | 8/1993 | Atkins et al. . |
| 5,287,427 | * | 2/1994 | Atkins et al. . |
| 5,500,031 | | 3/1996 | Atkins et al. . |
| 6,146,713 | * | 11/2000 | Cullen et al. . |

OTHER PUBLICATIONS

R. M. Atkins and P. J. Lemaire, "Effects of Elevated Temperature Hydrogen Exposure on Short–Wavelenght Optical Losses and Defect Concentrations in Germanosilicate Optical Fibers", J. Appl. Phys. 72 (2) Jul. 15 1992, pp. 344–348.
R. M. Atkins, et al., "Mechanisms of Enhanced UV Photosensitivity via Hydrogen Loading in Germanosilicate Glasses", Electronics Letters, 8[th]Jul. 1993, vol. 29, No. 14, pp. 1234–1235.

(List continued on next page.)

Primary Examiner—Michael P. Colaianni
(74) Attorney, Agent, or Firm—Néstor F. Ho

(57) ABSTRACT

A method for rapidly increasing the photosensitivity of an optical fiber comprising the step of providing an optical fiber comprising a glassy material and a thermally-stable coating. The thermally-stable coating has a thermally-stable exposure band, wherein desired time/temperature exposure parameters fall within the time/temperature thermal stability exposure band for the coating. The optical fiber is exposed for the desired time/temperature exposure to a hydrogen-containing atmosphere. The desired temperature is more than 250° C. and the desired time exposure does not exceed one hour. The glassy material then may be irradiated with actinic radiation, such that the refractive index of the irradiated portion results in a normalized index change of at least $10^{-5}$.

66 Claims, 11 Drawing Sheets

OTHER PUBLICATIONS

M. T. Bryk, "Degradation of Filled Polymers: High Temperature and Thermal–Ocidative Processes", Ellis Horwood, 1991, Chapter 1, pp. 9–70.

R. J. Campbell and R. Kashyap, "The Properties and Application of Photosensitive Germanosilicate Fibre", International Journal of Optoelectronics, 1994, vol. 9, No. 1, pp. 33–57.

P. E. Cassidy, "Nonheterocyclic Polymers: Backbones Containing Carbon and Oxygen and Their Thio Analogs", Thermally Stable Polymers, Marcel Dekker Inc., New York, 1980, Chapter 3, pp. 44–66.

A. H. Frazer, "Inorganic Polymers", High Temperature Resistant Polymers, Interscience Publishers/–John Wiley and Sons, New York, 1968, pp. 217, 222, 229, 231, and 247 of Chapter V.

N. H. Ky, et al., "Hydrogen–induced Reduction of Axial Stress in Optical Fiber Cores", Applied Physics Letters, vol. 74, No. 4, Jan. 25, 1999, pp. 516–518.

P. J. Lemaire, et al., "High Pressure $H_2$ Loading as a Technique for Achieving Ultrahigh UV Photosensitivity and thermal Sensitivity in $GeO_2$ Doped Optical Fibres", Electronics Letters, $24^{th}$ Jun. 1993, vol. 29, No. 13, pp. 1191–1193.

P. J. Lemaire, et al., "Refractive–index–changes in Optical Fibers Sensitized with Molecular Hydrogen", OFC'94, Feb. 20–25, 1994, vol. 4, pp. 47–48.

P. J. Lemaire, "Enhanced UV Photopsensitivity in Fibers and Waveguides by High–Pressure Hydrogen Loading", OFC'95 Technical Digest, Wednesday Afternoon, pp. 162–163.

G. D. Maxwell, et al., "UV Written 13dB Reflection Filters in Hydrogenated Low Loss Planar Silica Waveguides", Electronics Letter, $4^{th}$ Mar. 1993, vol. 29, No. 5, pp. 425–426.

G. D. Maxwell, et al., "UV Written 1–5 $\mu$m Reflection Filters in Single Mode Planar Silica Guides", Electronics Letters, $22^{nd}$ Oct. 1992, vol. 28, No. 22, pp. 2106–2107.

D. McStay, "Photosensitive Changes in GeDoped Fibers Observed by Raman Spectroscopy", SPIE, vol. 1314, Fibre Optics 1990.

G. Meltz, et al., "Bragg Grating Formation and Germanosilicate Fiber Photosensitivity", International Workshop on Photoinduced Self–Organization in Optical Fiber, SPIE, vol. 1516, May 10–11, 1991, pp. 185–199.

F. uellette, et al., "Enhancement of Second–Harmonic Generation in Optical Fibers by a Hydrogen and Heat Treatment", Applied Physics Letter 54 (12), Mar. 20, 1989, pp. 1086–1088.

F. Ouellette et al., "Permanent Photoinduced Birefringence in a Ge–doped Fiber", Applied Physics Letters, Apr. 29, 1991, vol. 58, p. 1813.

W. W. Wright, "The Development of Heat–Resistant Organic Polymers", Degradation and Stabilization of Polymers, G. Gueskens, Ed., Applied Science Publishers Ltd., London 1975, Chapter 3.

* cited by examiner

ACCELERATED METHOD FOR INCREASING THE PHOTOSENSITIVITY OF A GLASSY MATERIAL

BACKGROUND OF THE INVENTION

The present invention relates to a method for increasing the photosensitivity of optical fibers at rates several times faster than those accomplished by prior methods. Specifically, the present invention comprises a method for rapidly diffusing hydrogen or deuterium into silica glasses to increase the photosensitivity of these glassy materials, and in particular of optical fibers.

Optical fiber-based devices are vital components in today's expanding high-volume optical communications infrastructure. Many of these devices rely on fiber Bragg gratings (FBGs) to perform light manipulation. An FBG is an optical fiber with periodic, aperiodic or pseudo-periodic variations of the refractive index along its length in the light guiding region of the waveguide. The ability to produce these refractive index perturbations in a fiber is necessary to manufacture FBGs and, hence, a number of optical components, such as optical sensors, wavelength-selective filters, and dispersion compensators.

Gratings are written in optical fiber usually via the phenomenon of photosensitivity. Photosensitivity is defined as the effect whereby the refractive index of the glass is changed by actinic radiation-induced alterations of the glass structure. The term "actinic radiation" includes visible light, UV, IR radiation and other forms of radiation that induce refractive index changes in the glass. A given glass is considered to be more photosensitive than another when a larger refractive index change is induced in it with the same delivered radiation dose.

The level of photosensitivity of a glass determines how large an index change can be induced in it and therefore places limits on grating devices that can be fabricated practically. Photosensitivity also affects the speed that a desired refractive index change can be induced in the glass with a given radiation intensity. By increasing the photosensitivity of a glass, one can induce larger index perturbations in it at a faster rate.

The intrinsic photosensitivity of silica-based glasses, the main component of high-quality optical fibers, is not very high. Typically index changes of only $\sim 10^{-5}$ are possible using standard germanium doped fiber. However, it has been observed that by loading the glass with molecular hydrogen before irradiating it with actinic radiation, one can increase tremendously the photosensitivity of the glass. Index changes as large as $10^{-2}$ have been demonstrated in hydrogenated silica optical fibers.

An early reference to an increase in photosensitivity due to exposure to hydrogen may be found in D. McStay, "Photosensitivity Changes in Ge-Doped Fibers Observed by Raman Spectroscopy", SPIE, Vol. 1314, *Fibre Optics* 1990. A peak was observed for samples of a Corning 1521 fiber reported to have been immersed in a hydrogen bath at varying pressure, times and temperatures up to 150° C. An exemplary reported exposure consisted of a fiber treated at 1 atmosphere and 24° C. for 3 days. The fibers exhibited a weak photosensitive reaction.

In F. Ouellette et al., "Permanent Photoinduced Birefringence in a Ge-doped Fiber", Applied Physics Letters, Vol. 58, p. 1813, Apr. 29, 1991, reports an attempt to increase photosensitivity by hydrogen exposure at relatively high temperatures. Fiber strands having a core doped with germanium were put in a pressure chamber with 12 atm $H_2$ and heated at 400° C. for 4 hours. The total index change for the hydrogen-treated fiber was estimated to be close to $10^{-5}$. G. Meltz et a., SPIE, Volume 1516, International Workshop on Photoinduced Self-Organization in Optical Fiber, May 10–11, 1991, paper 1516–18 reports treating a doped germanosilicate preform rod for 75 hours at 610° C. in 1 atm $H_2$. Such high-temperature exposure later was found to cause high optical loss in the fiber, usually rendering the fiber useless. U.S. Pat. Nos. 5,235,659 and 5,287,427 discuss a method for exposing at least a portion of a waveguide at a temperature of at most 250° C. to $H_2$ (partial pressure greater than 1 atmosphere (14.7 p.s.i.), such that irradiation can result in a normalized index change of at least $10^{-5}$. U.S. Pat. No. 5,500,031, a continuation-in-part of the above-mentioned '659 patent, speaks of a method of exposing the glass to hydrogen or deuterium at a pressure in the range of 14– 11,000 p.s.i. and at a temperature in the range 21–150° C. The parameters described in these references are probably most typical for hydrogen-loading an optical fiber The '031, '659 and '427 references point out problems with hydrogen loading methods in which temperatures exceed 250° C., or even 150° C. In teaching away from such references, the '659 Patent indicates that at high-temperatures "typical polymer fiber coatings would be destroyed or severely damaged" (column 1, lines 51–54). It further emphasizes the fact that "the prior art high temperature sensitization treatment frequently increases the optical loss in the fiber and/or may weaken the fiber" (column 1, lines 54–56). Finally, the '659 patent differentiates itself from the prior art by stating that a high temperature treatment involves "a different physical mechanism" than does a low-temperature treatment.

To achieve the desired level of hydrogen in fiber with conventional hydrogenating methods (~1 ppm), one will typically expose fiber to a hydrogen atmosphere for several days and, in some cases, for several weeks. Exemplary exposures such as 600 hours (25 days), 21° C., at 738 atm or 13 days, 21° C. at 208 atm are reported as typical. Obviously, such long exposures extend the time required to fabricate optical devices that rely on photosensitive glass. Because of the long duration needed for traditional fiber hydrogenation, several pressure vessels are needed in a high-volume production environment to increase throughput and avoid idle time. These vessels are costly to install safely and increase the potential for serious accidents, especially when multiple vessels with separate control valves and gas supply cylinders are involved. Although installing multiple vessels can increase production throughput, the hydrogenation process hampers grating fabrication cycle time, thus new product and specialty product development time can be compromised severely.

The need exists for a more time-effective method for increasing the photosensitivity of glassy materials.

SUMMARY OF THE INVENTION

Hydrogen loading with prior methods relied on exposure times measured usually in the range of days or weeks. Even high temperature exposures were believed to require loading times in the range of several hours. Prior references further taught away from the use of high temperatures, indicating a belief that high temperature hydrogen treatments involved a different physical mechanism than low temperature treatments.

The present invention comprises a method to increase rapidly the photosensitivity of glassy material and an apparatus for accomplishing the method. The present invention also comprises articles obtained as a result of the application of the method.

The present invention relies on what is believed to be a more accurate understanding of the effect of temperature on hydrogen loading and on increased photosensitivity of glassy materials. A novel aspect of the present invention is the recognition that significant changes to the photosensitivity of a glassy material may be achieved by a novel loading method comprising a high temperature (greater than 250° C.) very rapid (exposure times of less than one hour) hydrogen exposure. The discovery of such rapid loading method allows for the use of suitable thermally-stable coatings by harmonizing the thermal stability time/temperature band of the coatings with the parameters of the rapid loading method.

In one embodiment of the method of the present invention, a glassy material is provided and is protected by a selected thermally stable coating. Once coated, the glassy material is placed into an atmosphere containing $H_2$ and/or $D_2$ at a temperature greater than 250° C. for an exposure time of less than one hour. Finally, portions of the glassy material are exposed to actinic radiation, resulting in a refractive index change greater than $10^{-5}$. In a preferred embodiment, the hydrogen exposure process of the present invention increases tremendously the photosensitivity of a glassy body, such as a silica optical fiber (125 $\mu$m diameter), in less than one (1) minute.

DETAILED DESCRIPTION OF THE INVENTION

Figure 1:
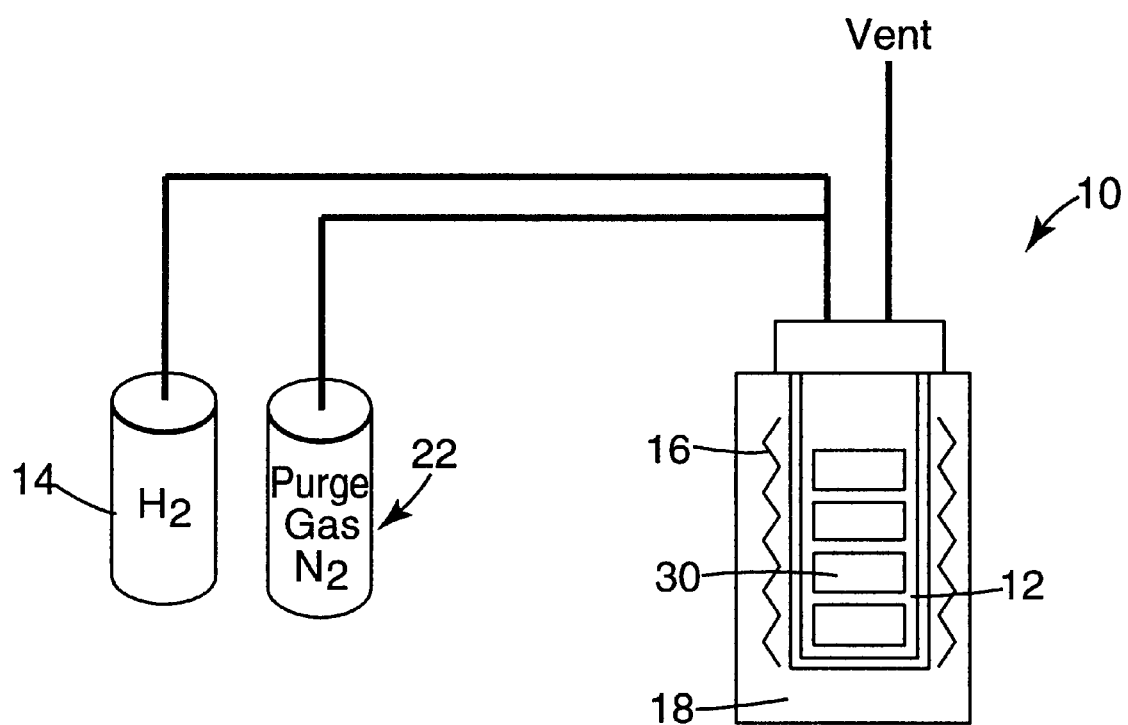
FIG. 1 is a simplified schematic diagram of a first embodiment of a hydrogen loading apparatus in accordance with the present invention.

FIG. 1 is a simplified schematic diagram of a first embodiment of a hydrogen loading apparatus 10 in accordance with the present invention. The hydrogen loading apparatus 10 includes a pressure vessel 12 and a hydrogen source 14. In one exemplary embodiment of the present invention, the vessel 12 is a high-pressure gas chamber, capable of withstanding gas pressures as large as 30,000 psi (~20,600 kilopascals). The apparatus 10 further includes a heater unit 16 and accompanying insulation 18 placed around the pressure vessel 12. A source of a purge gas 22, such as $N_2$, is provided to help evacuate the pressure vessel.

Figure 2:
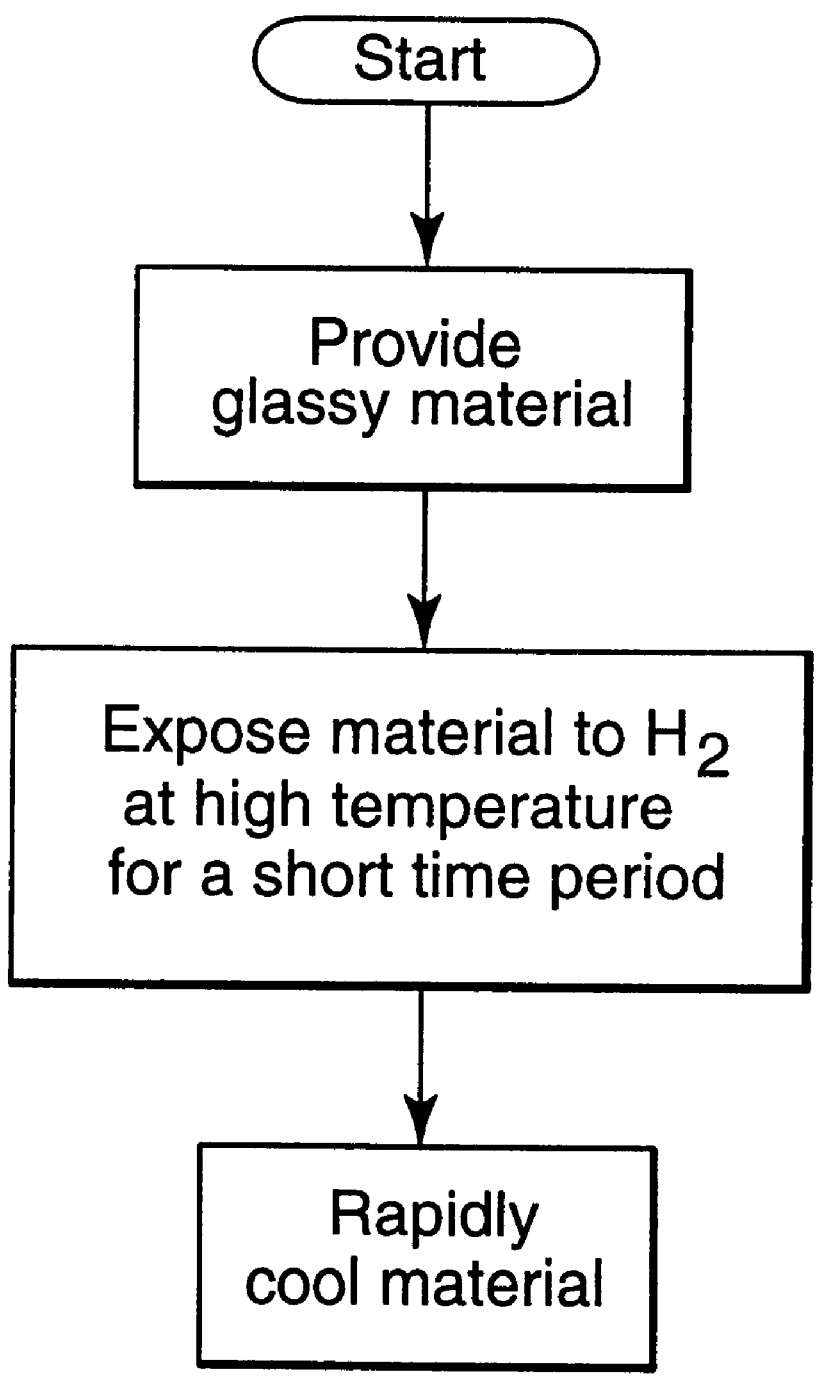
FIG. 2 is a flow diagram of the method for hydrogenating a glassy material in accordance with the present invention.

FIG. 2 is a flow diagram outlining the steps of an embodiment of the method of the present invention. The method for rapidly hydrogenizing a glassy material of the present invention includes the step of providing a glassy material, such as silicon glass. In one preferred embodiment, the material is coated with a thermally-stable material selected to have thermal stability characteristics that harmonize with the planned time/temperature/pressure exposure. The material is exposed to a hydrogen atmosphere at a temperature in excess of 250° C. for a time of less than one hour. In an alternative embodiment, the hydrogen atmosphere is pressurized above atmospheric pressure. The material is then rapidly cooled such as with an ice bath.

Without wishing to be bound by theory, the present invention relies on what is believed to be a more accurate understanding of the effect of temperature on hydrogen loading and of its ability to increase the photosensitivity of glassy materials. An aspect of the present invention is the recognition that significant changes to the photosensitivity of a glassy material may be achieved by a novel loading method comprising a high temperature (greater than 250° C.) very rapid (exposure times of less than one hour) hydrogen exposure. The discovery of such rapid loading method allows for extremely fast hydrogen loading using suitable thermally stable coatings by harmonizing the thermal stability time/temperature band of the coatings with the parameters of the rapid loading method.

Descriptions follow of methods to select appropriate high temperature tolerant coating material and achieve hydrogen saturation and subsequent photosensitization of a glassy material. The described methods combine known equations and models regarding diffusion with new understandings and approximation models based on experimental data.

Hydrogenation Process Parameter Determination

Based on a model described below, it has been found that one may increase rapidly the photosensitivity of a glassy material, such as a silica fiber, by exposing the fiber to a high temperature hydrogen environment (>250° C.). It further has been found that the process may be further accelerated by exposing the fiber at a very high hydrogen pressure (>10,000 psi).

Figure 3:
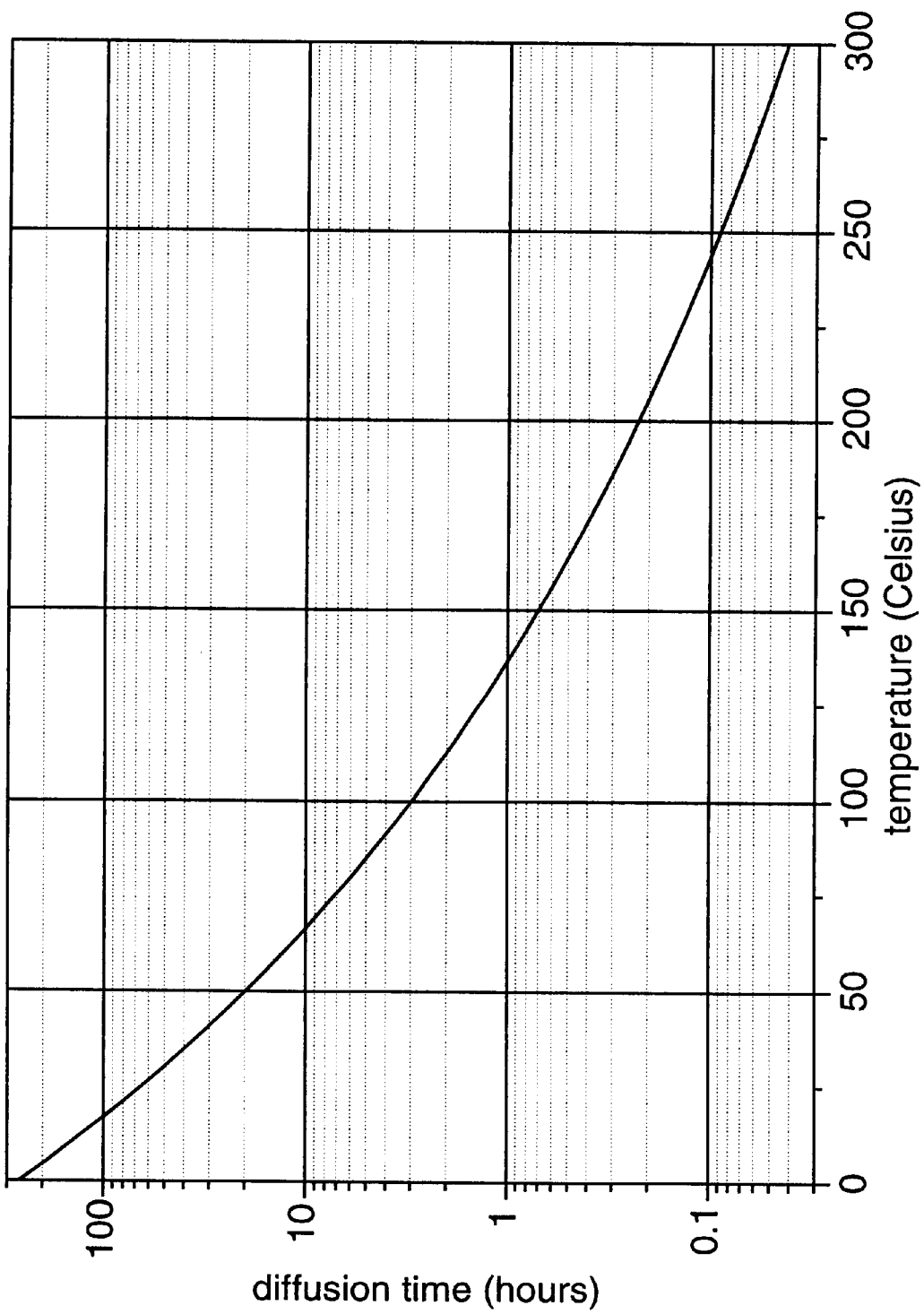
FIG. 3 is a graph of the hydrogen diffusion time into 125-$\mu$m-diameter silica optical fiber as a function of temperature using the theoretical model disclosed in the present invention.

FIG. 3 shows a graph of the hydrogen diffusion time into a fiber for a 125 $\mu$m diameter fiber at temperatures ranging from 20 to 300° C. made with a theoretical model shown below. For the purposes of the present invention, the term hydrogen will be used to describe $H_2$, HD, and $D_2$ molecules. The concentration of hydrogen in a fiber as a function of radius r and time t has been calculated to be $$C(r, t) = S \cdot \left[ 1 - \sum_{n=1}^{\infty} \frac{2 \cdot J_0\left(\alpha_n \cdot \frac{r}{r_0}\right)}{\alpha_n \cdot J_1(\alpha_n)} \cdot e^{-D\left(\frac{\alpha_n}{r_0}\right)^2 t} \right]. \quad (1)$$

where C is the concentration of hydrogen in the fiber, D is the diffusion coefficient, $\alpha_n$ is the $n^{th}$ root of the zero-order Bessel function of the first kind, $J_0$. $J_1$ is the first-order Bessel function of the first kind. Here the hydrogen concentration at saturation inside the fiber is taken as S. For convenience, the diffusion time constant is defined as $$t_D \equiv \frac{1}{D}\cdot\left(\frac{r_0}{\alpha_1}\right)^2 \approx 0.174\cdot\frac{r_0^2}{D} \quad (2)$$

The temperature dependence of the diffusion coefficient is described by an Arrhenius expression of the form $$D = D_0 \cdot \exp(-E/R\cdot T) \quad (3)$$

where $D_0$ is a constant, E is the activation energy, R is the gas constant (R=1.986 cal/mol·K) and T is the absolute temperature. By placing the values for $D_0$ and E into (1) and (3), one can calculate the hydrogen diffusion time into a fiber of a given radius. $D_0=125\cdot10^{-4}$ cm²s and E=9.046 Kcal/mole were the values used for the results graphed in FIG. 3. It should be noted that the diffusion time in FIG. 3 is plotted on a logarithmic scale, indicating that relatively small changes in the fiber temperature alter the diffusion time tremendously.

Figure 4:
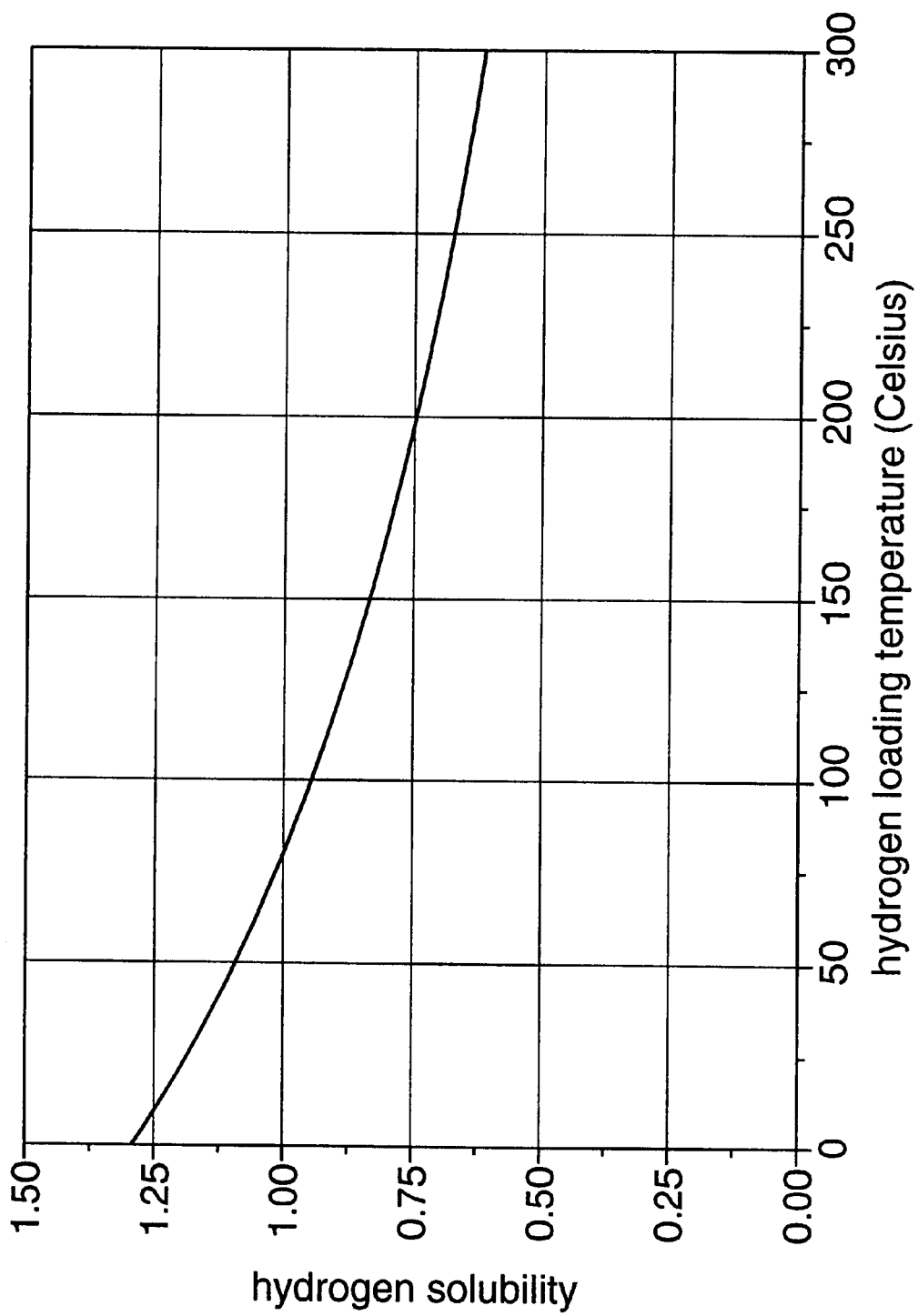
FIG. 4 is a graph of hydrogen solubility in silica optical fiber as a function of exposure temperature.

The solubility of hydrogen in glass can be described by an Arrhenius expression of the form $$S = P\cdot S_0 \cdot \exp(T_S R\cdot T) \quad (4)$$

where P is the loading pressure, $S_0$ is a constant, and $E_S$ is the solubility activation energy. $S_0=3.5\cdot10^{-2}$ (a.u.) and $E_S=1.78\pm0.21$ (Kcal/mole). The hydrogen solubility in silica fiber is plotted in FIG. 4. The curve is normalized to the solubility at 80° C. for convenience. As shown in FIG. 4, the hydrogen solubility is a relatively weak function of loading temperature compared to the diffusion time.

Figure 5:
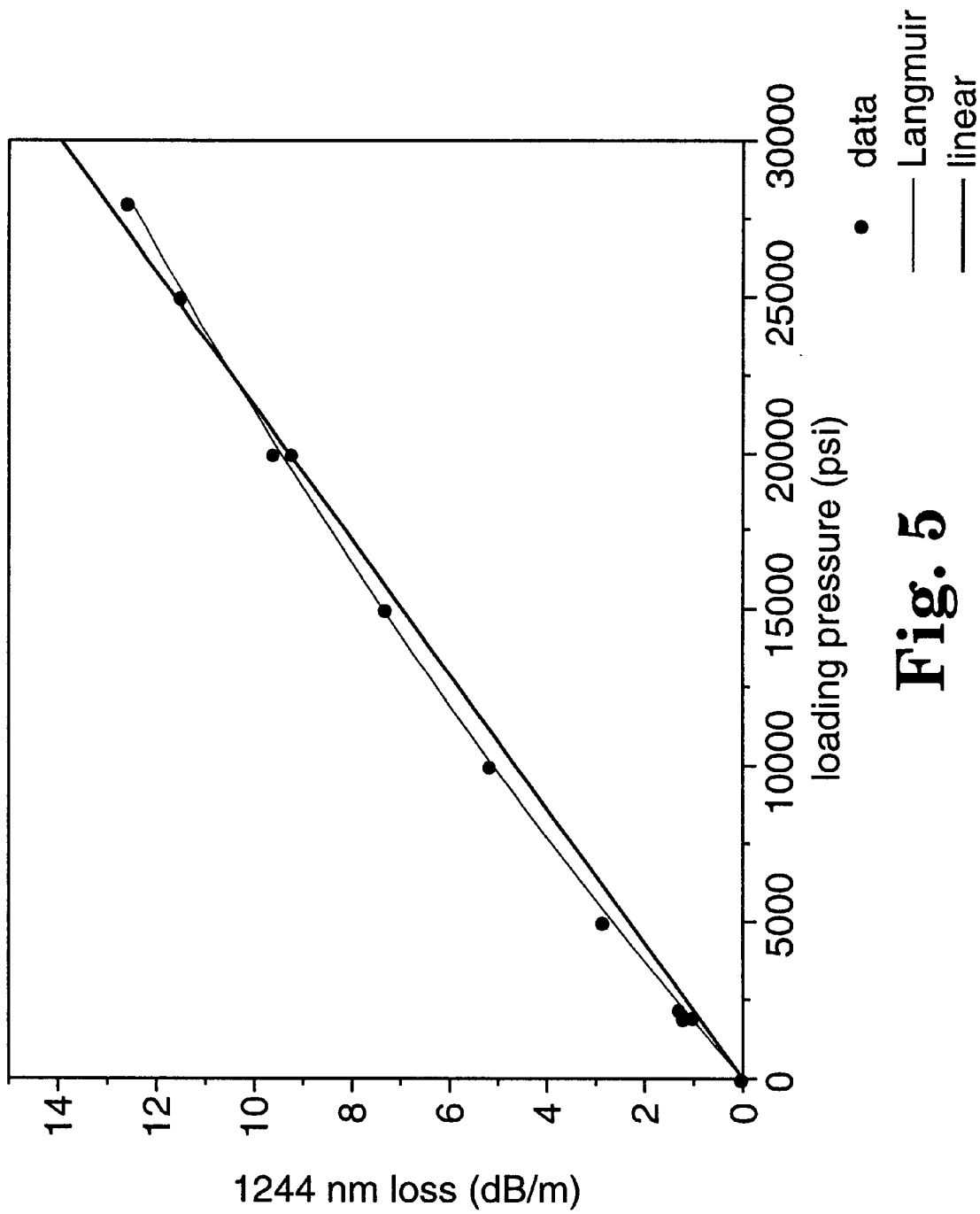
FIG. 5 is a graph of hydrogen solubility in silica optical fiber as a function of exposure pressure.

The $H_2$ content in the optical fibers versus different loading pressures is plotted in FIG. 5. A slight divergence of the data from a linear fit is noticeable, which may be due to measurement uncertainty or saturation effects (e.g., Langmuir model hole filing). Linear regression on this data yields a squared correlation coefficient $r^2=0.998$, but a slight divergence of the data from the linear fit is noticeable, which may be due to measurement uncertainty or saturation effects. Practically speaking, the hydrogen solubility in silica optical fibers increases linearly with loading pressure for pressures up to at least 28,000 psi.

By combining (1) and (4), the concentration of the hydrogen in the fiber, $[H_2]$, as a function of temperature, time, and pressure may be expressed as $$[H_2] \propto P\cdot S_0 \cdot e^{\frac{E_S}{R\cdot T}} \cdot \left[1 - \sum_{n=1}^{\infty} \frac{2\cdot J_0\left(\alpha_n\cdot\frac{r}{r_0}\right)}{\alpha_n\cdot J_1(\alpha_n)} \cdot e^{-D\left(\frac{\alpha_n}{r_0}\right)^2 t}\right] \quad (5)$$

where the diffusion constant D is a strong function of temperature as detailed in (3).

Analyzing the equations above, and since $[H_2]$ is linearly proportional to loading pressure, the model of the present invention then divides by the pressure, and, by neglecting the radial-position dependence of the hydrogen concentration. Equation (5) may be approximated as $$\frac{[H_2]}{P} \propto S_0 \cdot e^{\frac{E_S}{R\cdot T}} \cdot \left[1 - e^{-\frac{t}{t_D}}\right] \quad (6)$$

Figure 6:
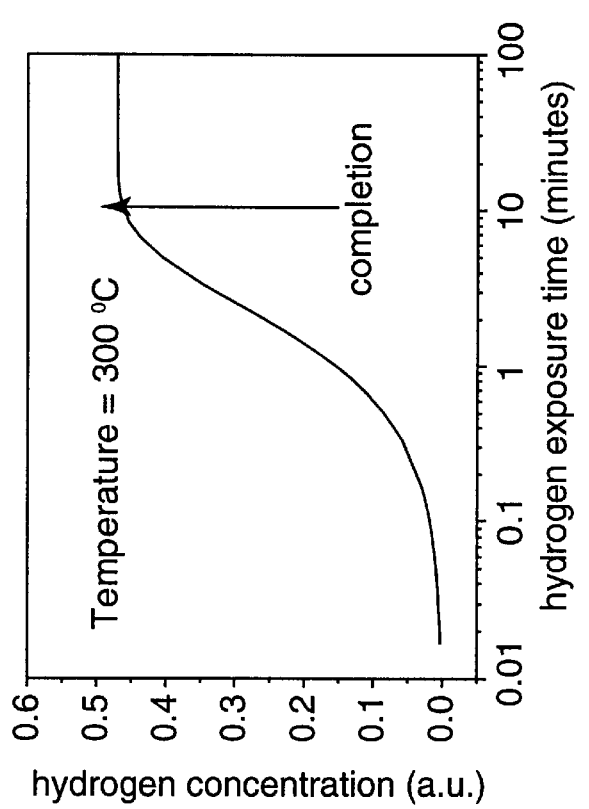
FIG. 6 is a graph comparing hydrogenation time under traditional methods with hydrogenation time using the method of the present invention.
Figure 6:
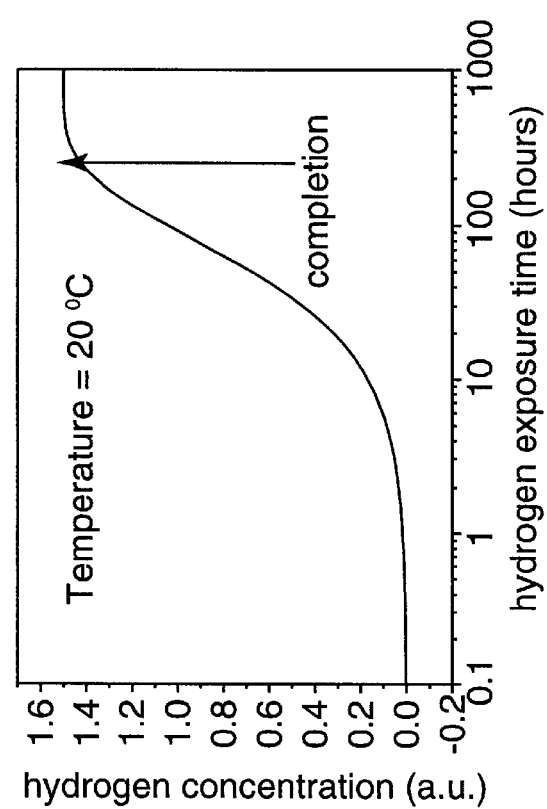

Accordingly, the above model, which is supported by experimental observations, shows that an increase in temperature of even a few tens of degrees above the traditional loading parameters would greatly increase the concentration of hydrogen in a glassy material, while drastically reducing the required exposure time. Using the method of the present invention, by raising the pressure and temperature of the loading conditions to ~20,000 p.s.i. and 260° C., one may achieve the same concentration of hydrogen in the fiber in ~60 seconds than that previously achieved after an exposure of 30 hours at 60° C. at a typical pressure of 2,000 psi., a reduction of ~1.8×10⁵ percent in exposure time. Assuming a direct relationship between the hydrogen concentration and an increase of photosensitivity of the glassy material, proportionally larger changes in photosensitivity of the glassy material would be achieved by such an exposure. FIG. 6 illustrates the comparative loading time for a glassy material placed in a hydrogen atmosphere at 20° C. versus the same sample place in an atmosphere at 300° C. Please note that the time scales are logarithmic and that the first graph uses hour units, while the second graph uses minute time units. The measurements are in arbitrary units (a.u.).

A possible concern arises that increasing the temperature used during hydrogenation of the optical fiber decreases the hydrogen diffusion time, but the hydrogen solubility in the fiber also decreases with increased temperature. An embodiment of the method of the present invention counters this decrease in solubility by increasing the pressure of the hydrogen environment. The exact combination of time, temperature and pressure required to load a particular fiber depends on the characteristics of the fiber, the coating, and the desired hydrogen concentration.

Fiber Coating Selection Process

Prior references taught expressly away from use of high-temperature hydrogen loading, indicating that polymer fiber coatings would be destroyed or at least severely damaged at temperatures higher than 250° C. However, those prior references failed to recognize the possibility of accelerated exposure yielding extremely fast loading times and the ability to harmonize the time/temperature requirements of the loading process with the thermal stability characteristics of specially selected materials. The present invention uses thermogravimetric (TGA) analysis tools, to recognize and identify high-temperature loading band for certain thermally stable polymers. Since, under the loading model of the present invention, the higher the loading exposure temperature, the shorter the required exposure time, it is possible to identify polymer coatings capable of maintaining sufficient performance characteristics for the combined time, temperature, and pressure loading conditions of the present method. By determining the behavior of a material as it is heated with the analysis tools described below, a person skilled in the art may harmonize the time/temperature thermal stability parameters of a proper coating with the appropriate combination of temperature, pressure and time required to load rapidly an optical fiber with hydrogen.

Typically, polymer materials are used to coat optical fibers only to protect them mechanically. "The thermal stability of polymers is a characteristic rather sensitive not only to their structure and composition but, in line with other phenomena associated with chemical processes, to the action of environmental factors, especially the presence of chemically active components in the environment such as oxygen, additives and fillers," *Degradation of Filled Polymers: High Temperature and Thermal-Oxidative Processes,* by M. T. Bryk, Ellis Horwood, 1991, relevant portions incorporated herein by reference. In addition, materials present in the local environment of the analysis that may act in a catalytic fashion on the chemical reactions of the degradative process need be considered. These materials may include the products of degradation and/or the materials from which the equipment is made.

The thermal stability and the thermal and thermal-oxidative processes of polymers have been studied. In polymers, the reactions that lead to degradation of the material depend on the chemical structure of the polymer. Chain scission reactions resulting from the formation of free radicals is a mechanism of degradation in polyethylene and poly(methyl methacrylate) whereas degradation of polyethylene terephthalate (PET) is by random chain scission followed by formation of lower molecular weight species with carboxyl and vinyl ester end groups. Polycarbonates eliminate carbon monoxide and carbon dioxide as a result of random cleavage of ester bonds. Polyimides can eliminate carbon monoxide via the thermal decomposition of the imide ring, or eliminate carbon dioxide via isomerization of the imide ring into an isoimide structure. Depending on the chemical structure of the polymer, crosslinking reactions may compete with the chain scission reactions.

The processes of polymer degradation may differ appreciably, however, the ultimate issue is to what extent can degradation occur without loosing the necessary characteristics of the polymers performance in the present application. Certainly degradation that leads to rapid chain scission followed by volatilization of monomer such as in poly(phthalaldehyde) would not be beneficial for some short duration exposures of the polymer to elevated temperatures. Other mechanisms that degrade the polymer more slowly clearly would be able to survive short duration exposures. Several factors are significant, such as temperature, time of exposure, the atmosphere and the surface area/volume ratio.

The coating material selection process in the present invention is based on an understanding of the interactions between the coating materials and the presently disclosed short-time, high-temperature hydrogenation process. Suitable materials may be selected from a group comprising fiber coating materials, that is, protective materials that may be disposed around a bare optical fiber or waveguide. The term "thermally stable material" is defined in the present invention as a material having sufficient thermal stability to avoid meaningful thermal degradation under the hydrogen loading conditions of the method of the present invention. Preferred materials are selected as to not deform, drip, fuse or volatize, all of which may result in the fiber being left bare or adhering to an adjacent fiber, under the required time/temperature exposure parameters. Preferably, the materials are selected such that when subject to the loading time and temperature parameters:

1) no visual bubbles or cracks in the coating or delaminations between the coating and the glass are apparent as measured optically at magnifications of 50× or less; and 2) no substantial thermal degradation is observed, as measured by thermogravimetric analysis, where no substantial thermal degradation is defined as total coating weight loss of less than about 10%, more preferably less than about 5% for conditions that mimic the heating, loading and cooling temperature profile in an inert atmosphere such as $N_2$.

In one embodiment, the coating will lose less than 2-wt. % as measured by thermogravimetric analysis (TGA) in conditions analogous to the process conditions. The coating material further is selected to not impede significantly the hydrogen diffusion into the fiber. Finally, the selected material desirably has a coating process compatible with fiber manufacture, and either the ability to allow writing of a grating through the coating or the ability to be stripped cleanly before writing.

The thermal stability of various materials was analyzed and related to the particular high-temperature hydrogen-loading process. The goal of the photosensitization process is to introduce hydrogen rapidly into the core of the optical fiber via diffusion. The issue was first to identify appropriate thermally stable materials and then to identify the time/temperature stability band for those materials, balancing between the increasing diffusion rate of hydrogen at higher temperatures and the increasing degradation rate of the polymer.

Figure 7:
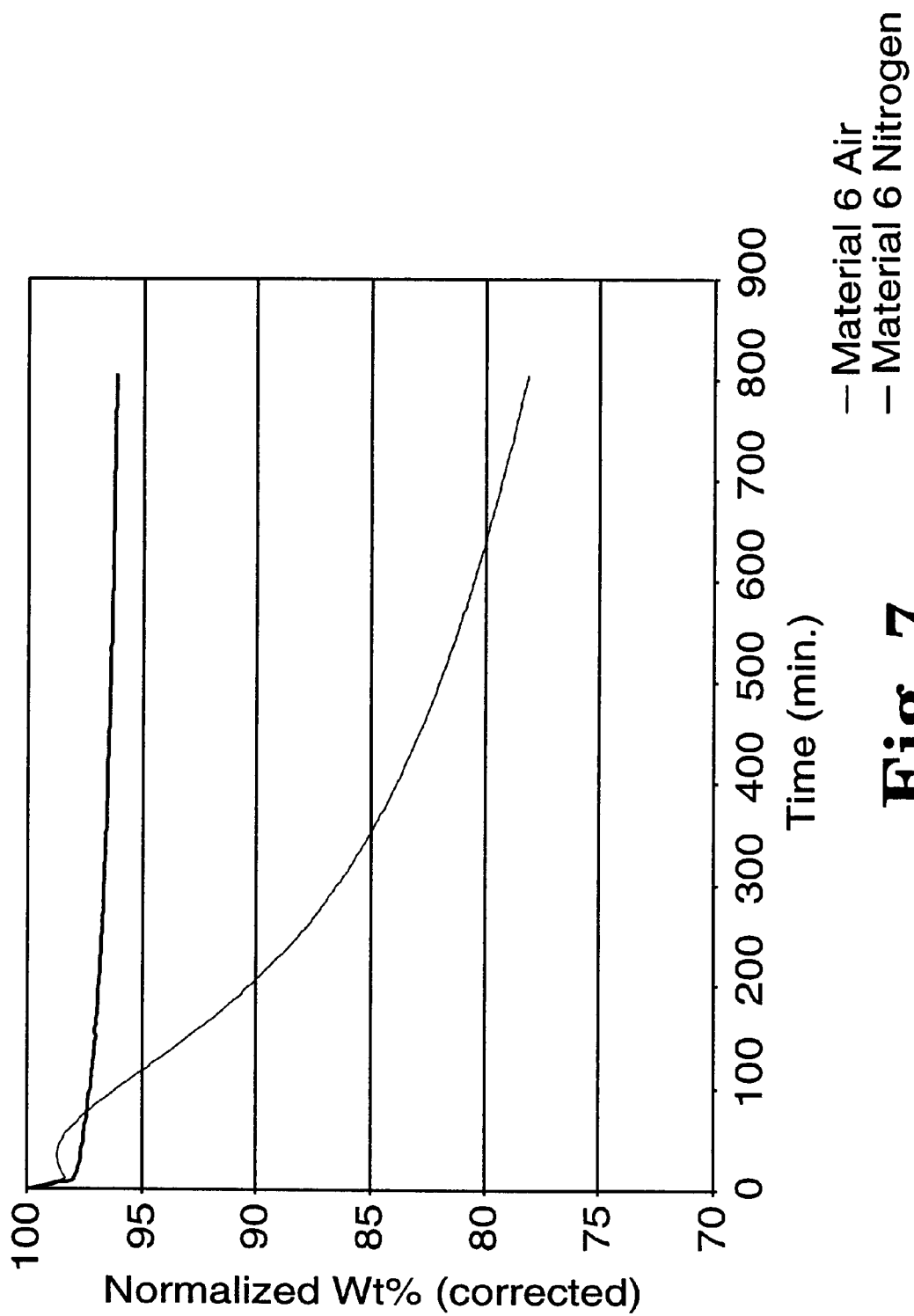
FIG. 7 is a graph showing the degradation curve of a polymer material in an air atmosphere, versus the degradation of the same material in a nitrogen atmosphere.

The analysis of the present invention considered the effect of thermogravimetric analysis of common polymers in air versus nitrogen. FIG. 7 shows the degradation curve of a polymer material in an air atmosphere, versus the degradation of the same material in a nitrogen atmosphere. It was observed that the inert atmosphere slows down the degradation process. And, in the case of thermo-oxidative processes, the amount of surface area exposed for a given weight of material is known to have an effect on the rate of degradation of the material.

Certainly an atmosphere of entirely hydrogen gas is not an oxidizing atmosphere, but it may not be completely inert to the polymer at elevated temperatures. The key is to identify the minimum time required to saturate the fiber with enough hydrogen to yield a desired photosensitivity and to coat the fiber with a material able to withstand that process without degrading.

The following example indicates an exemplary methodology to conduct the TGA material testing.

Material Testing Examples

Tests were performed on various samples using a modulated high-resolution TGA analyzer (TA Instruments, Model 2950), that included a gas-switching accessory. The tests were conducted using both nitrogen and air as a purge gas.

The materials that were examined are tabulated below and will be referred to herein as such:

| Sample | Source | Material Type |
|---|---|---|
| Material 1 | Commercial | Acrylate |
| Material 2 | Commercial | Polyimide |
| Material 3 | 3M internal | Acrylate |
| Material 4 | 3M internal | Polyimide |
| Material 5 | 3M internal | Acrylate |
| Material 6 | 3M internal | Carbon |

Their product numbers may identify the sample materials as follows:

| Manufacturer | Product ID | |
|---|---|---|
| 1) Corning SMF-28 | 601559189816 | |
| 2) Spectran SMT | A131OH | DC0556XA1 |
| 3) 3M Optical Transport Systems | CS-96-0110 | 907111-34879 |
| 4) 3M Optical Transport Systems | CS-97-5114 | 814640-206111 |
| 5) 3M Optical Transport Systems | CS-98-3103 | 908911-35446 |
| 6) 3M Optical Transport Systems | 3M Experimental carbon material | |

The samples used in this analysis were, with only one exception, coated optical fibers. The exception was a plasma-deposited carbon material. Since the coating weight of this diamond-like carbon (DLC), when coated to a 200 Å thickness on optical fiber, accounts for only ~0.06 wt % of the fiber, the standard TGA measurements were impractical, so the sample comprised material collected as flakes/powder from the coating chamber. The plasma deposited carbon sample has a surface area/volume ratio that is likely to be different than that on the fiber. The sample generally behaves as it would if it were a film on a fiber, assuming the silica surface does not affect the DLC degradation.

To prepare the fiber samples for analysis, each fiber was cut into lengths of ~3–4 mm such that the pieces could fit into the TGA platinum pan used in the TGA, which has a diameter of 5 mm and is ~2mm deep. Powder-free gloves were worn during the handling of the fiber to avoid transferring oils and contaminants from the skin to the sample. It is assumed that cutting the fiber length into 3–4 mm pieces does not appreciably affect the degradation process through the increases in surface area resulting from the cut ends. In the case of the plasma-deposited carbon material, the flakes were crushed such that an adequate amount of material could be placed into the sample pan.

The flow rates for both the nitrogen and the air purge were 44 cc/min for the furnace and 22 cc/min for the balance. A platinum sample pan was used, and the instrument was placed in mode TGA-1000° C.

To determine the long-term effects of a given temperature on coating material(s), an isothermal method was used where the temperature was increased rapidly to a desired temperature and then held for an extended duration. In the present examples the temperature of interest was 260° C. To determine the coating mass percentage, the temperature of specimens was increased to 900° C. at 20° C./min. in air until the coating was removed. While the time intervals for hydrogen loading in this inventive process are quite small, the thermogravimetric analyses were conducted over 800 minutes. Each heating method was used on all the tested samples with both nitrogen and air purges. The data sampling rate for the isothermal analyses was set at 10.0 sec./point (48000 sec.×0.1 point/sec.=4800 points). The temperature ramps were run at a data-sampling rate of 2.0 sec./point.

In some cases a small amount of material degradation was observed upon ramping to temperature for the isothermal runs, which is likely due to the loss of adsorbed volatile components, such as surface adsorbed water. This is most apparent in the sample of diamond like carbon (DLC) as it has a very high surface area. It is also apparent in the polyimide sample which, other than this phenomenon, show little change in mass during the run.

The resulting data contains time, temperature, and weight. The data is used to calculate a Weight % based on the initial weight of the sample. The thermogram is corrected for the glass fiber component, if any, and then normalized such that various coatings can be compared independent of coating weights used.

The Normalized Corrected Wt % data is fit to a four factor exponential decay of the form:

$$y = ae^{-bt} + ce^{-dt}$$

that provides r-square values of 0.99 or greater except in cases where the curve is not one of degradation and/or there is very little, if any mass loss (e.g. the polyimide coated fibers).

Figure 8:
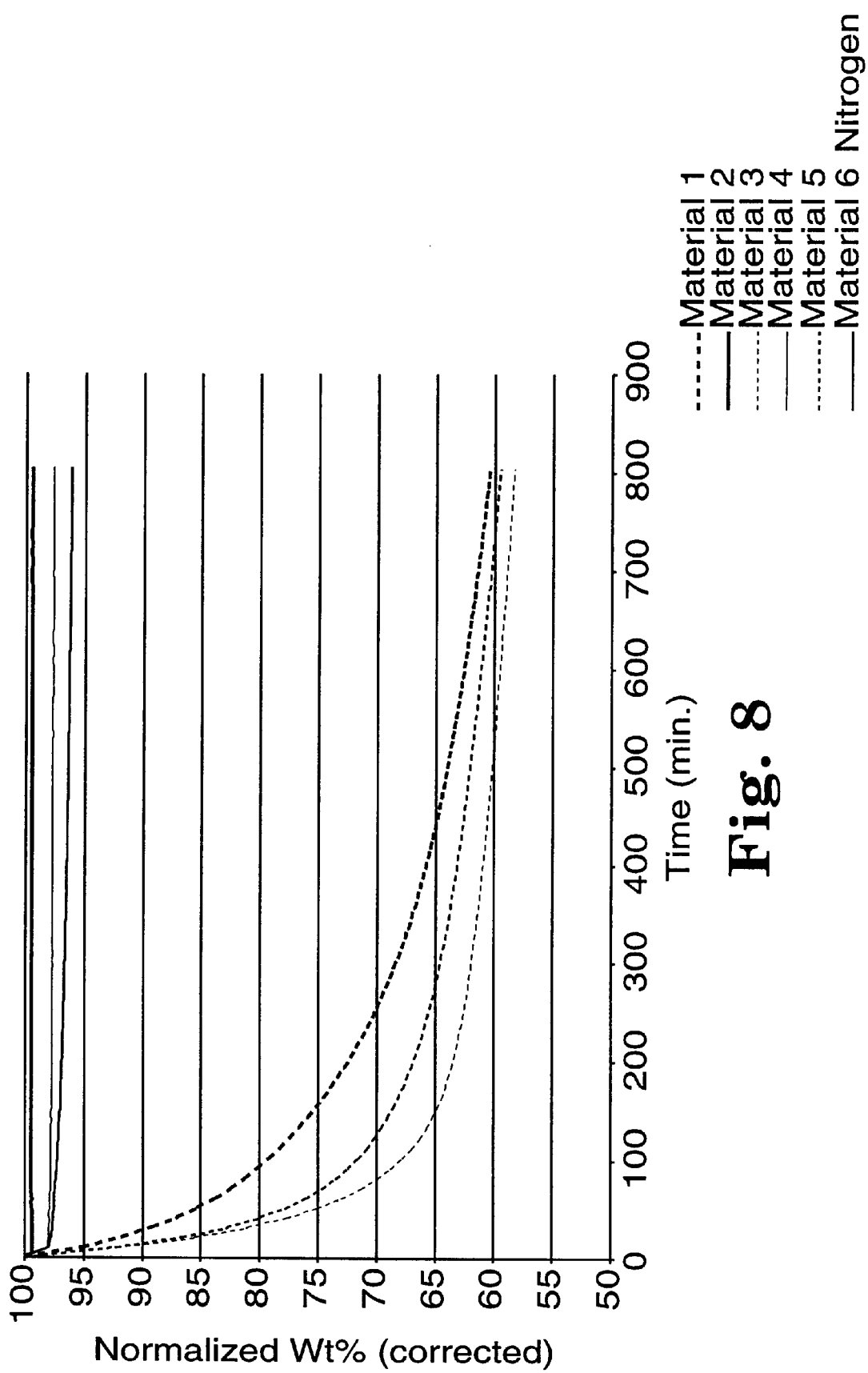
FIG. 8 is a graph showing a TGA thermogram of the various fiber coating samples in an inert atmosphere.

FIG. 8 shows a TGA thermogram of the various fiber coating samples in an inert atmosphere. The thermogram work done in inert atmospheres shows that there is little mass loss over the short periods of time necessary to effect hydrogen loading at 260° C. As the function of the polymeric coating is merely to provide a barrier to the surface of the glass element from mechanical abrasions and water, it is well possible that even longer periods of time would not affect this function for the materials used as fiber optic coatings. It is important to note that the TGA thermograms show the normalized wt % (corrected) vs. time at 260° C. This representation removes the silica component and coating weight from the analysis such that the materials are being compared equally.

Those fibers with a coating of polyimide (FIG. 8: Material 2 and 4) or DLC (Material 6) show no significant indication of degradation at 260° C. in an inert atmosphere. These thermally-stable coatings would be preferred coatings to protect a fiber during a 250–260° C. high-temperature hydrogen loading process in accordance with the present invention.

The method of the present invention also allows rapid hydrogen loading even with acrylate-based coatings (Material 1, 3, and 5). By matching the rapid hydrogen loading parameters of the method of the present invention with the time/temperature exposure characteristics of each compound, rapid hydrogen loading at elevated temperatures may be achieved without significant degradation.

Other possible suitable materials may be found. For instance, polymers containing carbocyclic and heterocyclic rings in the chain generally have been found to have the desired characteristics. Exemplary families of materials in these categories include polyimides; aromatic polyamides, polyesters, polysulfones and polyethers; polynorbomenes; polybenzoxazoles; and polyparaphenylene derivatives. Other suitable polymers include some thermally-stable polymers containing fluorine, polymers containing boron, phosphorous, or silicon, including polysiloxanes and polymetallosiloxanes, co-ordination polymers, and organometallic polymers. Examples and descriptions of possibly suitable materials may be found in Chapter 5 of High Temperature Resistant Polymers, A. H. Frazer, Interscience Publishers John Wiley and Sons, New York, 1968, the relevant portions of which are hereby incorporated by reference. Other references, the relevant portions of which also are incorporated by reference, include Degradation and Stabilization of Polymers, G. Gueskens, Ed., Applied Science Publishers Ltd, London 1975, Chapter 3, "The Development of Heat-Resistant Organic Polymers" by W. W. Wright and Thermally Stable Polymers, P. E. Cassidy, Marcel Dekker Inc. New York, 1980.

Examples of Rapid Photosensitization Process

An example of the method of the present invention follows. Referring again to FIG. 1, a glassy material, such as a spool 30 of silica glass optical fiber 32 having a Ge and/or B-doped core and/or cladding was provided. Such fibers may be readily obtained from companies such as Coming, Inc. of Coming, N.Y. or Redfern Photonics of Eveleigh, Australia. Methods for the manufacture, doping and coating of optical fibers are well known to those skilled in the art. A glassy material is defined as a material having no long-range structural order and being sufficiently solid and rigid enough not to exhibit flow on an observable time scale. This photosensitization process applies to other material systems, such as planar waveguides.

The optical fibers include a coating of a thermally stable material, such as polyimide coated fiber available from Polymicro Technologies, LLC (Phoenix, Ariz.). The coating helps protect the bare optical fibers from surface damage.

The thermal stability of the coating is determined according to the limiting temperature and exposure time conditions that give rise to some undesired change, normally degradation, in the coating that adversely influences its other properties. The parameters for the selection of thermally stable materials in the present invention have been defined above.

The coated optical fibers to be hydrogenated were placed inside of the vessel 12 preheated to 200° C. In the present example, the optical fiber 32 was wound on a spool 30 and the spool 30 was placed into a pressure vessel 12. The vessel was then purged with nitrogen and heated up to 260° C. over 35 minutes. The 260° C. vessel was filled with hydrogen up to 1900 psi, and the fiber 30 was then exposed to a hydrogen-containing atmosphere for 30 minutes. After 30 minutes, the fibers 30 were removed quickly from the vessel 12 and cooled rapidly by placing them on a cold thermally-conductive surface at 0° C., such as a plate of ice. Alternatively, the spools may be placed on a heat sink having a substantially lower temperature than the loading temperature. It has been found that rapid cooling helps minimize the amount of hydrogen that desorbs from the fiber.

The exposure process was conducted three times for three different samples under different conditions. The fibers were then exposed to actinic radiation patterns of similar intensity and for a similar amount of time to impress upon the fiber changes in the refractive index to fabricate fiber Bragg gratings. The photosensitivity of the fibers was determined by measuring the grating transmission of the resulting gratings. The results are summarized in Table 1 below.

TABLE 1

|  | Condition 1 | Condition 2 | Condition 3 |
| --- | --- | --- | --- |
| Preheat temperature | 200 ° C. | 240 ° C. | 60 ° C. |
| Final temperature | 260 ° C. | 300 ° C. | 60 ° C. |
| Heating time | 35 minutes | 40 minutes | 0 minutes |
| Hydrogen pressure | 1900 psi | 1850 psi | 1730 psi |
| Time fibers in the vessel | 30 minutes | 20 minutes | 30 minutes |
| Max. FBG attenuation | 4.5 dB | 1.7 dB | 0.05 dB |

Figure 9:
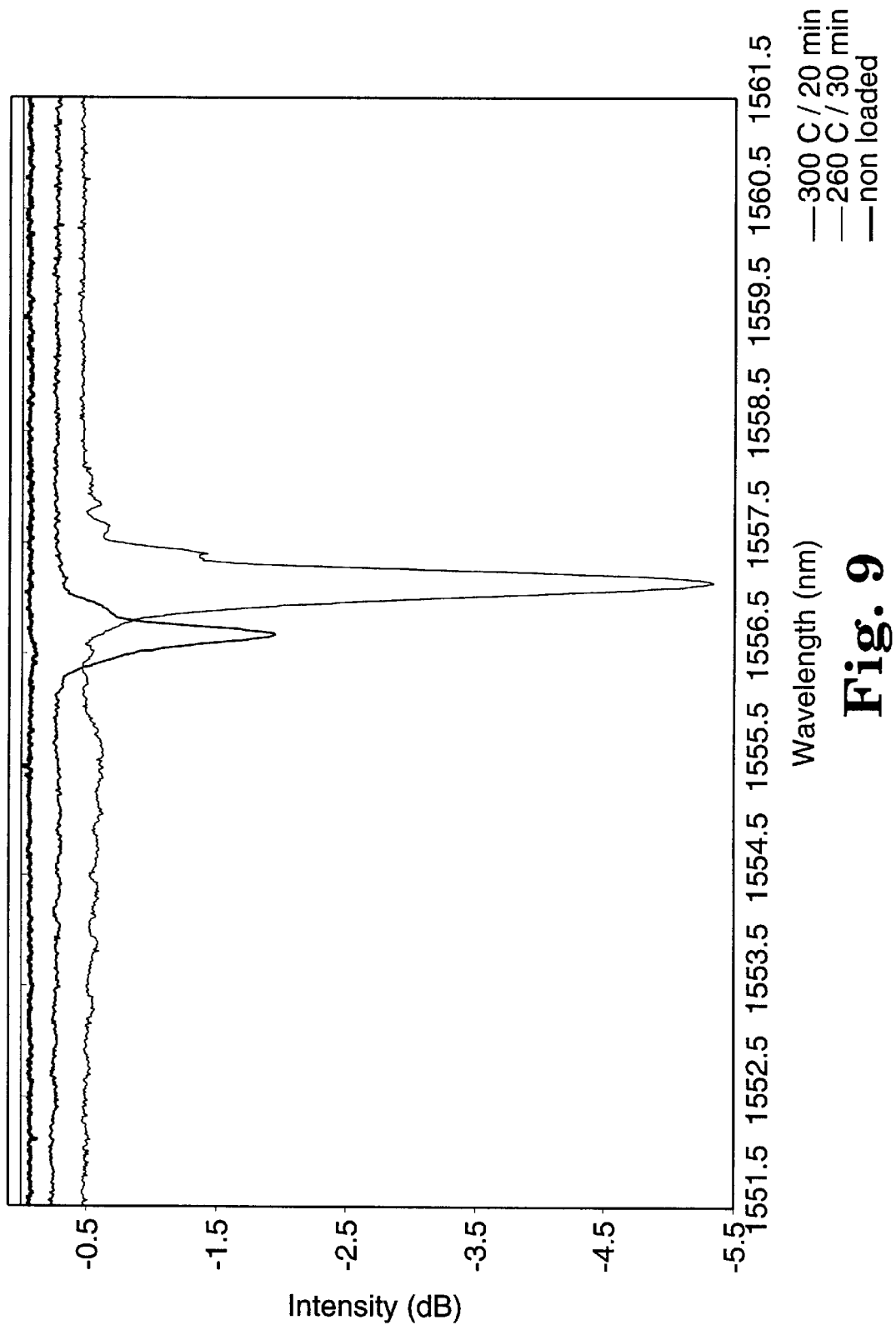
FIG. 9 is a graph comparing fiber Bragg gratings written in nonsensitized fiber and fiber sensitized with the methods of the present invention.
Figure 10:
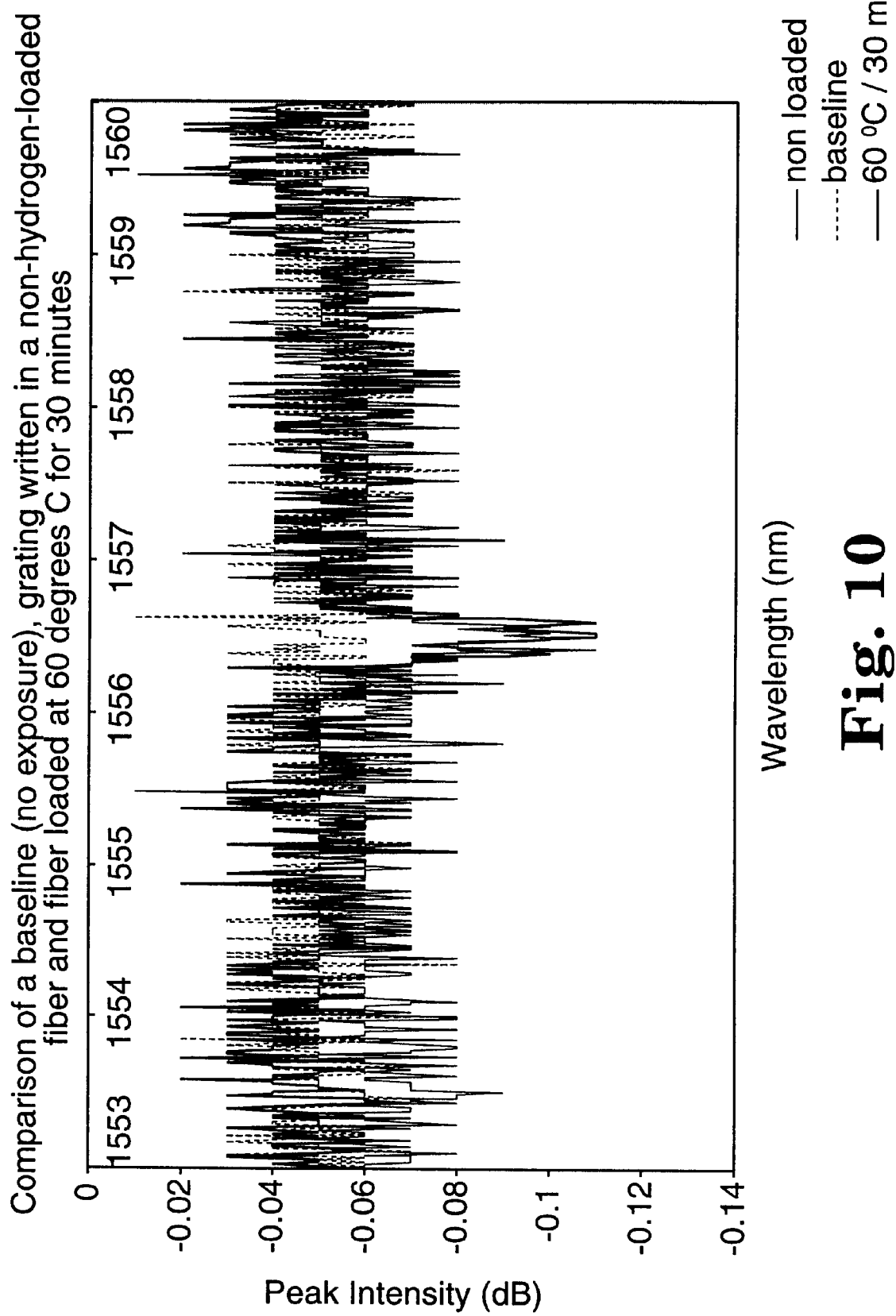
FIG. 10 is a graphical comparison of a baseline grating.

A significant increase in photosensitivity was observed for the fibers that were exposed to high-temperature hydrogen environments (Conditions 1 and 2), as compared with fibers that were not loaded with hydrogen, as shown in FIG. 9. The high-temperature loading process increased the strengths of the fiber Bragg gratings by 34 to 90 times. For comparison purposes, fibers were exposed to hydrogen environments that are commonly used (Condition 3) for durations similar to the ones used for this inventive high-speed photosensitization process. As shown in FIG. 10, the fibers loaded at 60° C. showed no significant increase in photosensitivity when compared to untreated fibers.

Figure 11:
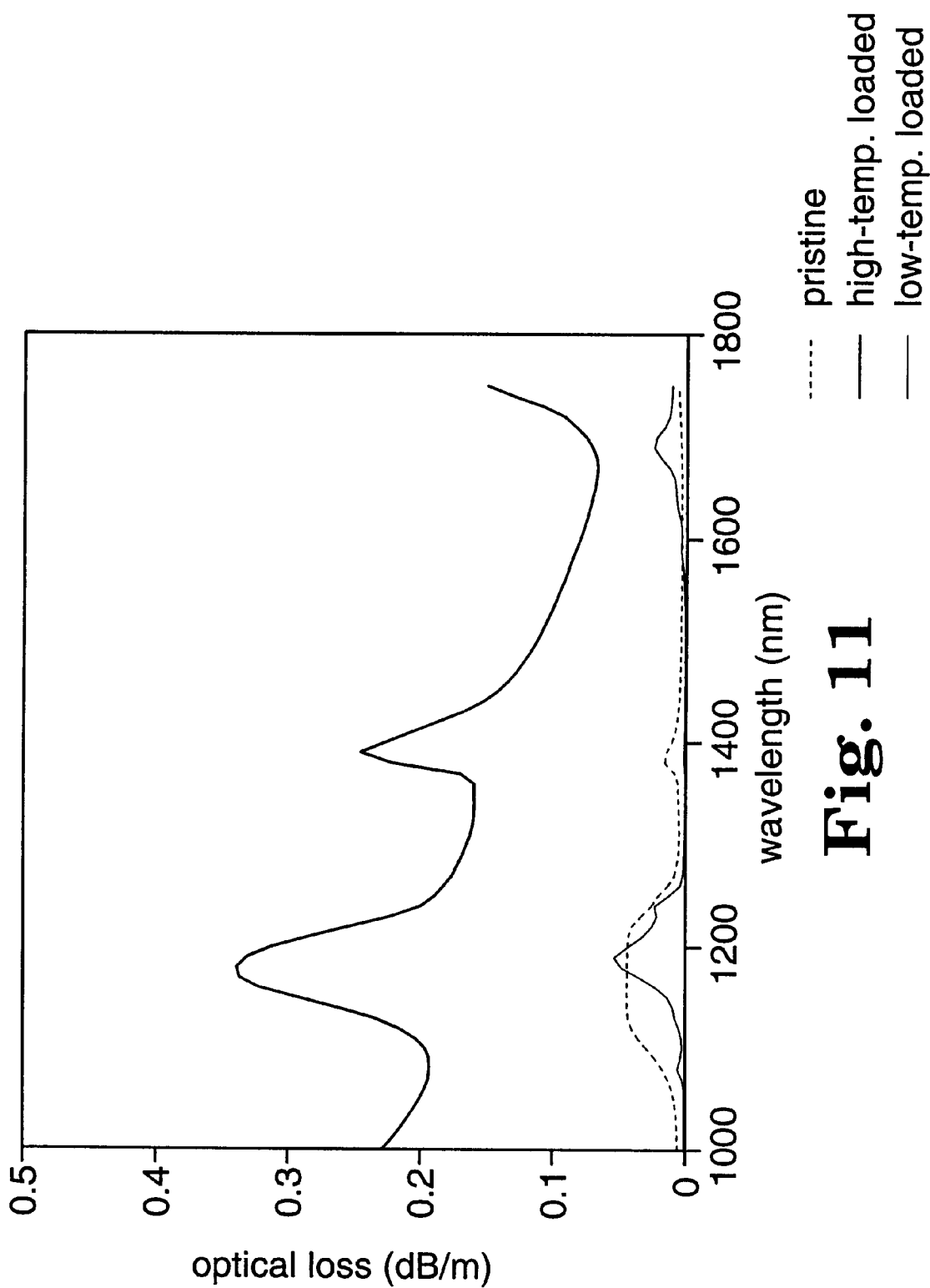
FIG. 11 is a graphical comparison of the permanent optical loss of the high-temperature loaded fiber compared to that loaded at a low-temperature (60° C.).

The permanent optical loss of the high-temperature loaded fiber compared to that loaded at a low-temperature (60° C.) is shown in FIG. 11. As shown, the optical loss does increase in high-temperature loaded fibers, but for many applications, this amount of loss is acceptable for producing commercial devices. Furthermore, by increasing the pressure of the hydrogen atmosphere in the high-temperature exposure process, one can reduce this optical loss by reducing the duration of the hydrogen exposure process.

The high-temperature, short time exposure method for increasing the photosensitivity of a glassy material of the present invention may be used to manufacture a number of optical devices that manipulate light. In an exemplary application, optical fibers are hydrogen loaded using the method described above. At least a portion of such optical fibers is exposed to a pattern of actinic radiation, to create index perturbation patterns, such as Bragg gratings.

Those skilled in the art will appreciate that the present invention may be used in the manufacture of a variety of optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for rapidly increasing the photosensitivity of an optical fiber, the method comprising the steps of:

a) providing an optical fiber comprising a glassy material and a thermally-stable coating, the thermally-stable coating having a thermally-stable exposure band, wherein desired time/temperature exposure parameters fall within the time/temperature thermal stability exposure band for the coating;

b) exposing the optical fiber for the desired time/temperature exposure to a hydrogen-containing atmosphere, wherein the desired temperature is more than 250° C. and the desired time exposure does not exceed one hour.

2. The method of claim 1, wherein the hydrogen-containing atmosphere has a hydrogen partial pressure of at least one atmosphere.

3. The method of claim 1, wherein the hydrogen-containing atmosphere has a temperature of at least 260° C. and a hydrogen partial pressure of at least 1,600 p.s.i.

4. The method of claim 1, wherein the time exposure is at most ninety seconds.

5. The method of claim 1, wherein the thermally stable coating is selected from a group consisting of polyimide and diamond-like coating.

6. The method of claim 1, wherein the time exposure is at most thirty minutes.

7. The method of claim 1, wherein the time exposure is at most one minute.

8. The method of claim 1, further comprising the steps of removing the waveguide from the hydrogen-containing atmosphere and rapidly cooling the optical fiber.

9. The method of claim 1, wherein the method further comprises a step of exposing at least a portion of the waveguide to actinic radiation, so that the index of refraction of the waveguide is increased by a factor $\Delta$ of at least $10^{-5}$.

10. The method of claim 9, wherein the step of exposing the at least a portion of the waveguide to actinic radiation comprises the step of writing a grating on the fiber.

11. A method for making an optical device, the method comprising the steps of:

a) providing a glassy material having an exterior thermally-stable coating;

b) exposing the glassy material and the exterior thermally-stable coating to a hydrogen-containing atmosphere at a temperature greater than 250° C., for an exposure time of less than about one hour such that the coating is thermally stable both during and after the exposing step;

c) irradiating at least a portion of the glassy material through the exterior thermally-stable coating with actinic radiation, such that the refractive index of the irradiated portion results in a normalized index change of at least $10^{-5}$.

12. A method for producing an optical fiber having an optical grating, comprising the steps of:
providing an optical fiber having a glass core and a thermally-stable exterior coating;
exposing first and second portions of said optical fiber to a hydrogen-containing atmosphere under exposure conditions comprising (a) an exposure temperature of greater than 250° C., and (b) an exposure time of less than about 1 hour, thereby forming a treated optical fiber wherein the coating is thermally stable during and after the exposing step; and
writing an optical grating on the treated optical fiber without removing the coating such that said first portion of the optical fiber contains the grating and said second portion of the optical fiber is devoid of any grating.

13. The method of claim 12, wherein the optical fiber is disposed on a spool, and wherein the spool is exposed to the hydrogen-containing atmosphere.

14. The method of claim 12, wherein the coating is stable under the exposure conditions.

15. The method of claim 12, wherein the coating undergoes a weight loss of less than 10% by weight, based on the original weight of the coating material, when placed in a nitrogen atmosphere under the exposure conditions.

16. The method of claim 12, wherein the coating undergoes a weight loss of less than 5% by weight, based on the original weight of the coating material, when placed in a nitrogen atmosphere under the exposure conditions.

17. The method of claim 12, wherein the coating undergoes a weight loss of less than 2% by weight, based on the original weight of the coating material, when placed in a nitrogen atmosphere under the exposure conditions.

18. The method of claim 12, wherein the coating is a diamond-like coating.

19. The method of claim 12, wherein the coating comprises a polyimide.

20. The method of claim 12, wherein the increase in sensitivity in the treated fiber is sufficient to give rise to a normalized refractive index difference along at least one axis of at least $10^{-5}$ when the fiber is exposed to actinic radiation.

21. The method of claim 12, wherein the hydrogen-containing atmosphere has a hydrogen partial pressure of at least 1600 p.s.i.

22. The method of claim 12, wherein the hydrogen-containing atmosphere has a hydrogen partial pressure of at least 10000 p.s.i.

23. The method of claim 12, wherein the exposure time is no greater than about 1 minute.

24. The method of claim 12, wherein the optical fiber is rapidly cooled after exposure to the hydrogen-containing atmosphere.

25. The method of claim 12, wherein the optical fiber is brought into contact with a heat sink during the cooling process.

26. The method of claim 12, wherein the hydrogen-containing atmosphere comprises deuterium.

27. A method for improving the photosensitivity of an optical fiber, comprising the steps of:
providing an optical fiber comprising a glass core and an exterior coating; and
exposing the optical fiber to a hydrogen-containing atmosphere under exposure conditions comprising (a) a temperature of greater than 250° C., and (b) an exposure time of less than about 1 hour;
wherein the coating is thermally-stable under the exposure conditions.

28. The method of claim 27, further comprising the step of writing a Bragg grating onto the optical fiber.

29. The method of claim 27, wherein the Bragg grating is written on the optical fiber without removing the coating.

30. The method of claim 27, wherein the optical fiber is disposed on a spool, and wherein the spool is exposed to the hydrogen-containing atmosphere.

31. The method of claim 27, wherein the coating is a diamond-like coating.

32. The method of claim 27, wherein the coating comprises a polyimide.

33. The method of claim 27, wherein the increase in sensitivity in the treated fiber is sufficient to give rise to a normalized refractive index difference along at least one axis of at least $10^{-5}$ when the fiber is exposed to actinic radiation.

34. The method of claim 27, wherein the hydrogen-containing atmosphere has a hydrogen partial pressure of at least 1,600 p.s.i.

35. The method of claim 27, wherein the hydrogen-containing atmosphere has a hydrogen partial pressure of at least 10,000 p.s.i.

36. The method of claim 27, wherein the exposure time is no greater than about 1 minute.

37. The method of claim 27, wherein the optical fiber is rapidly cooled after exposure to the hydrogen-containing atmosphere.

38. The method of claim 27, wherein the optical fiber is brought into contact with a heat sink during the cooling process.

39. The method of claim 27, wherein the coating undergoes a weight loss of less than 10% by weight, based on the original weight of the coating material, when placed in a nitrogen atmosphere under the exposure conditions.

40. The method of claim 27, wherein the coating undergoes a weight loss of less than 5% by weight, based on the original weight of the coating material, when placed in a nitrogen atmosphere under the exposure conditions.

41. The method of claim 27, wherein the coating undergoes a weight loss of less than 2% by weight, based on the original weight of the coating material, when placed in a nitrogen atmosphere under the exposure conditions.

42. The method of claim 27, wherein the hydrogen-containing atmosphere comprises deuterium.

43. A method for producing an optical fiber having increased photosensitivity, comprising the steps of:
providing an optical fiber comprising a glass core and a thermally-stable exterior coating;
exposing the optical fiber to hydrogen gas heated to a temperature of greater than 250° C. until the optical fiber is essentially saturated with hydrogen, thereby forming a treated optical fiber and wherein the coating is thermally stable under the conditions at which it is exposed to the hydrogen gas; and
rapidly cooling the treated optical fiber.

44. The method of claim 43, further comprising the step of writing a Bragg grating onto the treated optical fiber through the use of an actinic radiation source.

45. The method of claim 43, wherein the Bragg grating is written onto the optical fiber without removing the coating.

46. The method of claim 43, wherein the optical fiber is disposed on a spool, and wherein the spool is exposed to the hydrogen gas.

47. The method of claim 43, wherein the coating is a diamond-like coating.

48. The method of claim 43, wherein the coating comprises a polyimide.

49. The method of claim 43, wherein the increase in sensitivity in the treated fiber is sufficient to give rise to a normalized refractive index difference along at least one axis of at least 10-5 when the fiber is exposed to actinic radiation.

50. The method of claim 43, wherein the hydrogen gas has a hydrogen partial pressure of at least 1,600 p.s.i.

51. The method of claim 43, wherein the hydrogen gas has a hydrogen partial pressure of at least 10,000 p.s.i.

52. The method of claim 43, wherein the optical fiber is exposed to the hydrogen gas for an exposure time of no greater than about 1 minute.

53. The method of claim 43, wherein the optical fiber is brought into contact with a heat sink during the cooling process.

54. The method of claim 43, wherein the heat sink comprises anice bath.

55. The method of claim 43, wherein the coating undergoes a weight loss of less than 10% by weight, based on the original weight of the coating material, when placed in a nitrogen atmosphere under the exposure conditions.

56. The method of claim 43, wherein the coating undergoes a weight loss of less than 5% by weight, based on the original weight of the coating material, when placed in a nitrogen atmosphere under the exposure conditions.

57. The method of claim 43, wherein the coating undergoes a weight loss of less than 2% by weight, based on the original weight of the coating material, when placed in a nitrogen atmosphere under the exposure conditions.

58. The method of claim 43, wherein said hydrogen gas comprises deuterium.

59. The method of claim 43, wherein the optical fiber is preheated to a temperature greater than 250° C. in a nitrogen atmosphere prior to being exposed to the hydrogen gas.

60. A method for increasing the photosensitivity of an optical fiber to actinic radiation, comprising the steps of:

providing an optical fiber comprising a glass core and a thermally-stable exterior coating; and exposing the optical fiber to a hydrogen-containing atmosphere under exposure conditions comprising an exposure temperature of greater than 250° C., thereby forming a treated optical fiber;

wherein the coating is thermally stable both during and after the exposing step such that the coating undergoes a weight loss of less than 10% by weight, based on the original weight of the coating material, when placed in a nitrogen atmosphere under the exposure conditions.

61. The method of claim 60, wherein the coating undergoes a weight loss of less than 5% by weight, based on the original weight of the coating material, when placed in the nitrogen atmosphere under the exposure conditions.

62. The method of claim 60, wherein the coating undergoes a weight loss of less than 2% by weight, based on the original weight of the coating material, when placed in the nitrogen atmosphere under the exposure conditions.

63. The method of claim 60, wherein the optical fiber is rapidly cooled after exposure to the hydrogen-containing atmosphere.

64. The method of claim 60, further comprising the step of writing an Bragg grating onto the treated optical fiber through the use of an actinic radiation source.

65. The method of claim 60, wherein the hydrogen-containing atmosphere has a hydrogen partial pressure of at least 1,600 p.s.i.

66. The method of claim 43, wherein the hydrogen-containing atmosphere has a hydrogen partial pressure of at least 10,000 p.s.i.

* * * * *

UNITED STATES PATENT AND TRADEMARK OFFICE
CERTIFICATE OF CORRECTION

PATENT NO.    : 6,311,524 B1
DATED         : November 6, 2001
INVENTOR(S)   : James F. Brennan, III, Diann A. Sloan, Maureen T. Fahey and James C. Novack It is certified that error appears in the above-identified patent and that said Letters Patent is hereby corrected as shown below:

<u>Title page,</u>
Item [56], Other References, "F. uellette" should read -- F. Ouellette --.

<u>Column 5,</u>
Line 15, "cm$^2$s" should read -- cm$^2$/s --.
Equation 4: "(T$_s$R˙T) should read -- E$_s$/R˙T) --.

<u>Column 10,</u>
Lines 52 and 53, "Coming" should read -- Corning --.

<u>Column 15,</u>
Line 2, "10-5" should read -- 10$^{-5}$ --.
Line 14, "anice" should read -- an ice --.
Line 29, "claim 43" should read -- claim 60 --.

Signed and Sealed this

Eleventh Day of June, 2002

*Attest:*

JAMES E. ROGAN
*Attesting Officer*          *Director of the United States Patent and Trademark Office*